US012737642B2

(12) United States Patent
Smith et al.

(10) Patent No.: US 12,737,642 B2
(45) Date of Patent: Sep. 15, 2026

(54) DATA DRIVEN RANKING OF COMPETING ENTITIES IN A MARKETPLACE

(71) Applicant: INTERNATIONAL BUSINESS MACHINES CORPORATION, Armonk, NY (US)

(72) Inventors: Jonathan M. Smith, White Plains, NY (US); Sheema Usmani, White Plains, NY (US); Alexander Shypula, New York, NY (US); Phillip Werner Simplicio, West Hartford, CT (US); Biplav Srivastava, Rye, NY (US); Amir Sabet Sarvestani, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1226 days.

(21) Appl. No.: 17/247,448

(22) Filed: Dec. 11, 2020

(65) Prior Publication Data

US 2022/0188653 A1 Jun. 16, 2022

(51) Int. Cl.

| | |
|---|---|
| ***G06N 5/022*** | (2023.01) |
| ***G06F 18/214*** | (2023.01) |
| ***G06F 18/22*** | (2023.01) |
| ***G06N 20/00*** | (2019.01) |
| ***G06Q 10/0637*** | (2023.01) |

(52) U.S. Cl.

CPC ........... *G06N 5/022* (2013.01); *G06F 18/214* (2023.01); *G06F 18/22* (2023.01); *G06N 20/00* (2019.01); *G06Q 10/0637* (2013.01)

(58) Field of Classification Search

CPC ...... G06N 5/022; G06N 20/00; G06F 18/214; G06F 18/22; G06Q 10/0637

See application file for complete search history.

(56) References Cited

U.S. PATENT DOCUMENTS

| | | | |
|---|---|---|---|
| 6,446,061 | B1 | 9/2002 | Doerre |
| 6,711,589 | B2 | 3/2004 | Dietz |
| 7,673,234 | B2 | 3/2010 | Kao |
| 7,974,984 | B2 | 7/2011 | Reuther |
| 10,354,188 | B2 | 7/2019 | Chalabi |
| 10,394,955 | B2 | 8/2019 | Fauceglia |

(Continued)

OTHER PUBLICATIONS

Baum, et al., "Hits and Misses: Managers' (Mis)Categorization of Competitors in the Manhattan Hotel Industry", Geography and Strategy (Advances in Strategic management) Abstract, 2003, 1 page, vol. 20, Emerald Group Publishing Limited, DOI: 10.1016/S0742-3322(03)20004-8, Retrieved from the Internet: <URL: https://www.emerald.com/insight/content/doi/10.1016/S0742-3322(03)20004-8/full/html>.

(Continued)

*Primary Examiner* — Cesar B Paula
*Assistant Examiner* — David Tan
(74) *Attorney, Agent, or Firm* — Elliot J. Shine

(57) ABSTRACT

A method, computer system, and a computer program product for competitive analysis is provided. The present invention may include identifying one or more potential competitors by searching a knowledge corpus using one or more see terms. The present invention may include determining one or more competitors by eliminating at least one potential competitor. The present invention may include generating a competitive analyst report.

19 Claims, 5 Drawing Sheets

(56) References Cited

U.S. PATENT DOCUMENTS

| | | | | |
|---|---|---|---|---|
| 10,552,468 | B2 | 2/2020 | Ciulla | |
| 11,392,651 | B1 * | 7/2022 | McClusky | G06F 16/338 |
| 2010/0153183 | A1 * | 6/2010 | Ulwick | G06Q 10/0631 705/348 |
| 2014/0006415 | A1 * | 1/2014 | Rubchinsky | G06F 16/24578 707/748 |
| 2015/0278731 | A1 * | 10/2015 | Schwaber | G06Q 10/0639 717/102 |
| 2019/0026280 | A1 * | 1/2019 | Aviyam | G06F 16/958 |
| 2019/0221080 | A1 * | 7/2019 | Reetz | G07F 17/3223 |
| 2021/0287261 | A1 * | 9/2021 | Medalion | G06N 3/044 |

OTHER PUBLICATIONS

Disclosed Anonymously, "Context-Based Concept Resolution with Structured and Unstructured Sources," IP.com, May 17, 2016, 7 pages, IP.com No. IPCOM000246223D.

Disclosed Anonymously, "Method and System for Creating Dynamic Ontologies and Knowledge Graphs for Search Engines," IP.com, Jan. 24, 2018, 4 pages, IP.com No. IPCOM000252560D.

Lederman, et al., "Identifying Competitors in Markets with Fixed Product Offerings," Columbia Business School Research Paper No. 14-10, Jan. 2014, 39 pages, Retrieved from the Internet: <URL: https://papers.ssm.com/sol3/papers.cfm?abstract_id=2374497>.

Meij, et al., "Method and System for Automatically Explaining Entity Relationships in a Knowledge Graph," IP.com, Jun. 15, 2015, 3 pages, IP.com No. IPCOM000242025D.

Mell, et al., "The NIST Definition of Cloud Computing", National Institute of Standards and Technology, Special Publication 800-145, Sep. 2011, 7 pages.

Morales, et al., "Computerized Competitiveness Analysis," Application and Drawings, Filed on Aug. 6, 2020, 29 Pages, CN Patent Application Serial No. 202010782699.7.

Morales, et al., "Computerized Competitiveness Analysis," Application and Drawings, Filed on Sep. 9, 2019, 41 Pages, U.S. Appl. No. 16/564,252.

Reynolds, "The Organization Ontology," W3C via Wayback Machine, Jan. 16, 2014 [accessed on Dec. 11, 2020], 20 pages, Retrieved from the Internet: <URL: https://web.archive.org/web/20201121143504/ http://www.w3.org/ TR/vocab-org/>.

Santini, et al., "Designing an Extensible Domain-Specific Web Corpus for "Layfication": A Case Study in eCare at Home," Cyber-Physical Systems for Social Applications, 2019, 61 pages, IGI Global, DOI: 10.4018/978-1-5225-7879-6.ch006.

Screen capture from The FOAF Project entitled "FOAF (2000-2015+)," [accessed on Jul. 8, 2020], 1 page, Retrieved from the Internet: <URL: http://www.foaf-project.org/>.

Undisclosed, "Skills-ML," Data at Work, [accessed on Jul. 8, 2020], 2 pages, Alfred P. Sloan Foundation, Retrieved from the Internet: <URL: http://dataatwork.org/skills-ml/>.

Xu, "Bootstrapping Relation Extraction from Semantic Seeds," Dissertation, 176 pages, Saarland University, DE.

Zhang, et al., "SemRe-Rank: Improving Automatic Term Extraction by Incorporating Semantic Relatedness With Personalised PageRank," ACM Trans. Knowl. Discov. Data, Nov. 2017 [Mar. 28, 2018], 40 pages, vol. 9, Issue 4, Article 39, arXiv:1711.03373v3, https://doi.org/0000001.0000001.

* cited by examiner

DATA DRIVEN RANKING OF COMPETING ENTITIES IN A MARKETPLACE

BACKGROUND

The present invention relates generally to the field of computing, and more particularly to marketplace analysis.

Competitive analysis may be a critical part of any business. Competitive analysis may involve the identification of competitors, both existing and emerging, by reading through annual reports, speaking to clients, analyzing press releases, amongst other strategies. Today, performing a competitive analysis may be even more difficult due to the multifaceted nature of companies. Additionally, hiring a third party for such an analysis may be costly and the report generated may only have a limited time period of applicability. Furthermore, competitive analysis may be susceptible to subjective judgments as well as bias.

A competitive analysis may be most useful when it is performed objectively while utilizing all available resources.

SUMMARY

Embodiments of the present invention disclose a method, computer system, and a computer program product for competitive analysis. The present invention may include identifying one or more potential competitors by searching a knowledge corpus using one or more see terms. The present invention may include determining one or more competitors by eliminating at least one potential competitor. The present invention may include generating a competitive analyst report.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
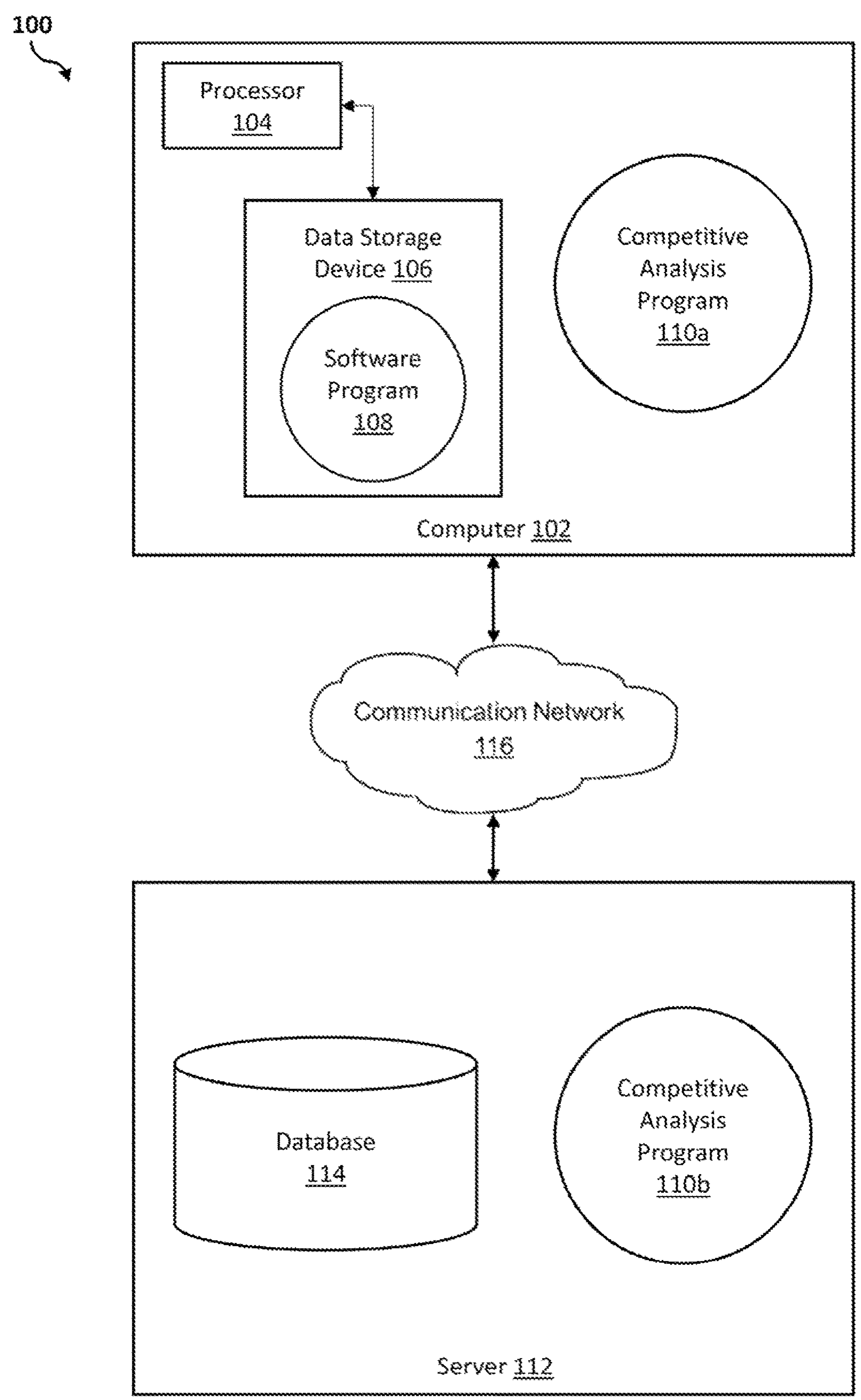
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for competitive analysis. As such, the present embodiment has the capacity to improve the technical field of marketplace analysis by identifying one or more competitors in a competitive analysis report that is updated in real time. More specifically, the present invention may include identifying one or more potential competitors by searching a knowledge corpus using one or more seed terms. The present invention may include determining one or more competitors by eliminating at least one potential competitor. The present invention may include generating a competitive analysis report.

As described previously, competitive analysis may be a critical part of any business. Competitive analysis may involve the identification of competitors, both existing and emerging, by reading through annual reports, speaking to clients, analyzing press releases, amongst other strategies. Today, performing a competitive analysis may be even more difficult due to the multifaceted nature of companies. Additionally, hiring a third party for such an analysis may be costly and the report generated may only have a limited time period of applicability. Furthermore, competitive analysis may be susceptible to subjective judgments as well as bias.

A competitive analysis may be most useful when it is performed objectively while utilizing all available resources.

Therefore, it may be advantageous to, among other things, identify one or more seed terms based on manual input, internal documentation, and external documentation, eliminating one or more potential competitors, and generating a competitive analysis report.

According to at least one embodiment, the present invention may improve the effectiveness of competitive analysis by generating a competitive analysis report capable of being updated in real time.

According to at least one embodiment, the present invention may improve the reliability of a list of competitors by weighting the mentions of the one or more potential competitors.

According to at least one embodiment, the present invention may improve the understanding of a target business by dynamically determining the favorability of the target business in comparison to one or more competitors.

According to at least one embodiment, the present invention may improve removing bias in determining one or more competitors by identifying existing and emerging competitors using artificial intelligence in real time.

According to at least one embodiment, the presentation mat improves competitive analysis reports by providing additional insights, such as, why a company is considered a competitor, or how the competitor differs from the target business.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a competitive analysis program 110*a*. The networked computer environment 100 may also include a server 112 that is enabled to run a competitive analysis program 110*b* that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902*a* and external components 904*a*, respectively, and client computer 102 may include internal components 902*b* and external components 904*b*, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the competitive analysis program 110*a*, 110*b* may interact with a database 114 that may be embedded in various storage devices, such as, but not limited to a computer/mobile device 102, a networked server 112, or a cloud storage service.

According to the present embodiment, a user using a client computer 102 or a server computer 112 may use the competitive analysis program 110*a*, 110*b* (respectively) to identify existing and emerging competitors using artificial intelligence in real time. The competitive analysis method is explained in more detail below with respect to FIG. 2.

Figure 2:
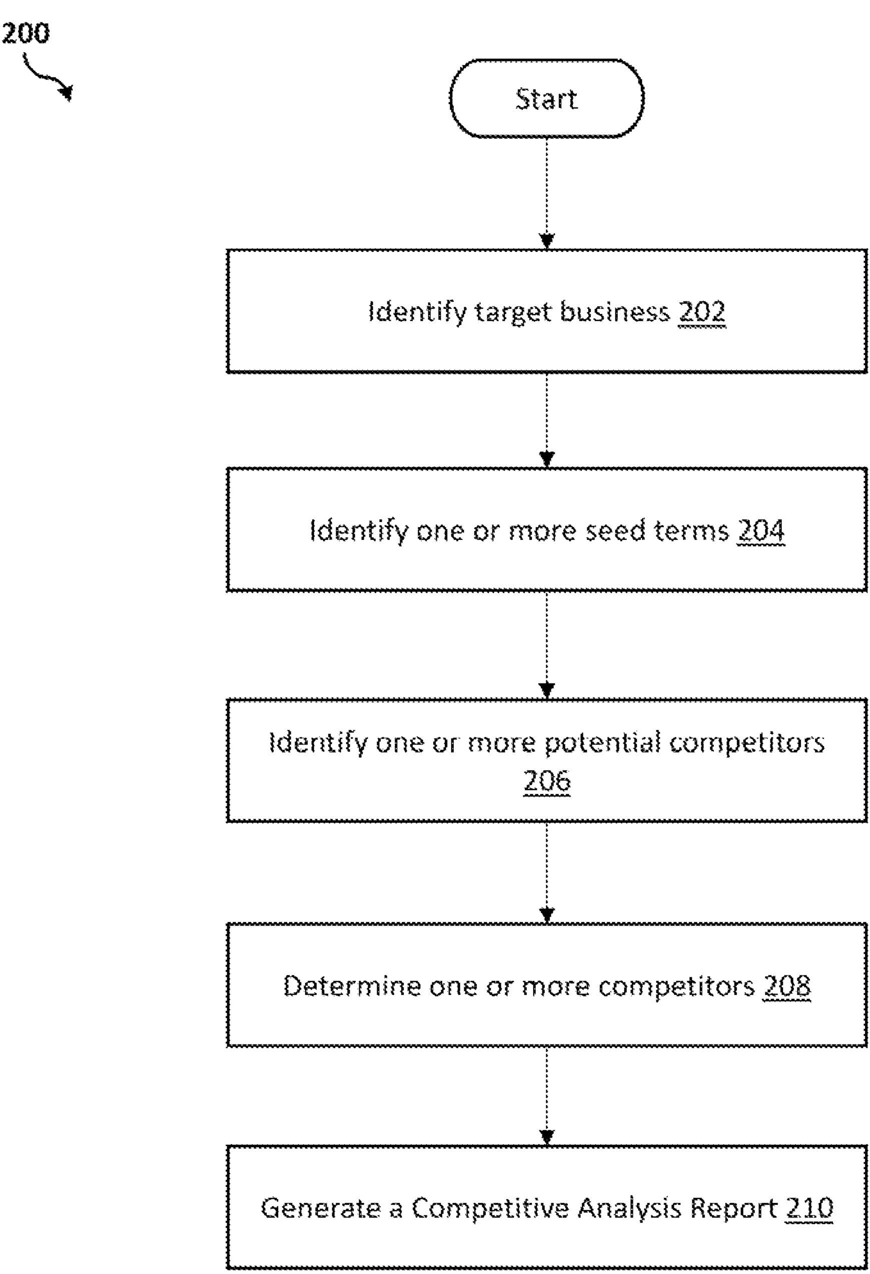
FIG. 2 is an operational flowchart illustrating a process for competitive analysis according to at least one embodiment.

Referring now to FIG. 2, an operational flowchart illustrating the exemplary competitive analysis process 200 used by the competitive analysis program 110*a* and 110*b* (hereinafter competitive analysis program 110) according to at least one embodiment is depicted.

At 202, a target business is identified. The target business may be a business which the competitive analysis program 110 will analyze, identify one or more potential competitors, determine one or more competitors, and generate a competitive analysis report, as will be explained in more detail with respect to steps 204 through 210.

The target business may be identified by a client. The target business may include, but is not limited to including, an entire company, a department within a company, a geographical region of a company, a product of a company, a service offered by a company, amongst others.

For example, the client may be Company A. Company A may be looking to acquire Company B. Company A may identify Company B as the target business. In another example, the client may be Company C. Company C may be losing market share with respect to a service offered by Company C in Geographical Region D. Company C may identify the service offered in Region D as the target business.

At 204, the competitive analysis program identifies one or more seed terms. Seed terms may be keywords associated with the target business (e.g., domain). The competitive analysis program 110 may identify one or more seed terms based on manual input. The competitive analysis program 110 may identify one or more seed terms based on internal documentation. The competitive analysis program 110 may identify one or more seed terms based on external documentation.

The competitive analysis program 110 may identify one or more seed terms based on manual input. The manual input may be ontology terms relating to the target business (e.g., domain). The ontology terms may relate to the target business taxonomy (e.g., domain taxonomy). The target business taxonomy (e.g., domain taxonomy) will be explained more in depth with respect to internal documentation below. The manual input may also be seed terms directly identified by the client.

The competitive analysis program 110 may identify one or more seed terms associated with the target business (e.g., domain) based on internal documentation. The competitive analysis program 110 may be provided the internal documentation by the client. The internal documentation may be preexisting documentation as well as documentation created for the purposes of the competitive analysis program 110.

Internal documentation may include the target business taxonomy (e.g., domain taxonomy). The target business taxonomy may relate to all aspects of the target business (e.g., domain). The target business taxonomy (e.g., domain taxonomy) may include, but is not limited to including, business processes, infrastructure, employee hierarchy, business services, amongst others. The competitive analysis program 110 may use ontology terms manually input to identify one or more seed terms within the target business taxonomy (e.g., domain taxonomy).

Internal documentation may further include, but is not limited to further including, marketing decks, internal skill assessments, marketing decks for offerings in a specified division of the target business, offer descriptions, job postings, production plans, internal memos, unpublished patents, descriptions of upcoming goals and development areas, amongst others.

The internal documentation may be stored in a target business knowledge corpus (e.g., domain knowledge corpus). The target business knowledge corpus (e.g., domain knowledge corpus) may be a database specific to the target business (e.g., domain).

The competitive analysis program 110 may utilize a machine learning model with Natural Language Processing (NLP) in identifying one or more seed terms associated with the target business based on the internal documentation. The machine learning model with NLP may utilize one or more text analysis techniques, such as, but not limited to, keyword extraction in identifying one or more seed terms associated with the target business (e.g., domain) based on the internal documentation. The competitive analysis program 110 may train the machine learning model with NLP based on at least manual verification and manual elimination, as will be described more in depth below.

The competitive analysis program 110 may identify one or more seed terms based on external documentation. External documentation may be publicly available. External documentation may include, but is not limited to including, job postings, earnings reports, annual reports, public contracts, press releases, social media posts, user reviews, analyst reports, published patents, amongst others. The competitive analysis program 110 may store the external documentation in a knowledge corpus. The knowledge corpus may be comprised of external documentation relating to one or more businesses.

The competitive analysis program 110 may utilize a machine learning model with NLP in identifying the one or more seed terms associated with the target business based on the external documentation. The machine learning model with NLP may utilize one or more text analysis techniques, such as, but not limited to, keyword extraction in identifying one or more seed terms associated with the target business based on the external documentation. The competitive analysis program 110 may train the machine learning model with NLP based on at least manual verification and manual elimination, as will be described more in depth below.

The competitive analysis program 110 may perform a semantic relatedness analysis utilizing the one or more seed terms identified based on manual input, the one or more seed terms identified based on internal documentation, and the one or more seed terms identified based on external documentation. The semantic relatedness analysis may eliminate one or more seed terms based on a similarity threshold.

The semantic relatedness analysis may eliminate one or more seed terms identified based on internal documentation. The semantic relatedness analysis may eliminate one or more seed terms identified based on external documentation.

An embodiment of the semantic relatedness analysis may involve n-Gram tokenization, wherein tokens are generated for the one or more seed terms. Conversion of those tokens into vectors through vectorization, utilizing a word embedding technique such as, but not limited to word2vec or GloVe. Then utilizing a similarity metric, such as, but not limited to, cosine similarity to calculate a distance between the one or more seed terms. Grouping seed based on whether they are above or below a similarity threshold.

Seed terms above the similarity threshold may require verification. Verification may be manual verification (e.g., human verification, verifying manually, verifying by a user) or automatic verification (e.g., use seed terms above the similarity threshold) before storing the one or more seed terms on the target business corpus (e.g., domain corpus). An embodiment of the semantic relatedness analysis may utilize manual verification.

Eliminating seed terms below the similarity threshold may be manual elimination (e.g., human elimination, eliminating manually, eliminating by a user) or automatic elimination (e.g., eliminate the one or more seed terms below the similarity threshold). An embodiment of the semantic relatedness analysis may utilize manual elimination.

The competitive analysis program 110 may have a default similarity threshold with respect to the semantic relatedness analysis. The default similarity threshold may be adjusted. The competitive analysis program 110 may have more than one similarity threshold. Each of the one or more similarity thresholds may utilize either manual or automatic verification and elimination. For example, there may be a high similarity threshold utilizing automatic verification, a low similarity threshold utilizing automatic elimination, and a range of similarities requiring manual verification (e.g., human verification, verifying manually, verifying by a user) and manual elimination (e.g., human elimination, eliminating manually, eliminating by a user).

The competitive analysis program 110 may train the machine learning model with NLP based on at least manual verification (e.g., human verification, verifying manually, verifying by a user) and manual elimination (e.g., human elimination, eliminating manually, eliminating by a user). The competitive analysis program 110 may train the machine learning model with natural language processing based on the one or more seed terms verified manually stored in the target business knowledge corpus.

The semantic relatedness analysis may use additional techniques, such as, but not limited to, string similarity (e.g., edit distance), word embeddings trained on a general corpus, Latent semantic indexing (LSI), averaging unigram word embeddings, no human verification process of below similarity threshold terms, and performing the semantic relatedness analysis for seed terms based on their source (e.g., job skills to job postings).

The semantic relatedness analysis may calculate the distance between the one or more seed terms identified based on manual input and the one or more seed terms identified based on internal documentation or external documentation. For example, the seed term A and seed term B may be identified based on manual input. Seed term C may be identified based on internal documentation. Seed term D and E may be identified based on external documentation. The semantic relatedness analysis may determine that seed term C is above the similarity threshold based on the distance from seed term A. The semantic relatedness analysis may determine that seed term D and seed term E were below the similarity threshold based on their distances from seed term A and seed term B. Seed term C may be manually verified (e.g., human verification, verifying manually, verifying by a user). Seed term D and seed term E may be manually eliminated (e.g., human elimination, eliminating manually, eliminating by a user). The competitive analysis program 110 proceeds to step 206 with seed term A, seed term B, and seed term C. Seed terms A, B, and C are stored in the target business corpus (e.g., domain corpus).

In the above example, an example of seed term A may be "Data Science," an example of seed term B may be "Artificial Intelligence," and an example of seed term C may be "Deep Learning."

If, for example, there are no seed terms identified based on manual input but instead seed term F is identified based on internal documentation. Seed term G and H are identified based on external documentation. The semantic relatedness analysis may determine the relatedness of seed term G based on its distance from seed term F and may determine the relatedness of seed term H based on its distance from seed term F. Seed term G may below the similarity threshold and seed term H may be above the similarity threshold. However, seed term G may be manually verified, and seed term H may be manually eliminated. Seed terms F and G would be stored on the target business corpus (e.g., domain corpus).

At 206, the competitive analysis program identifies one or more potential competitors. The competitive analysis program 110 may identify the one or more potential competitors by utilizing at least the one or more seed terms stored in the target business corpus (e.g., domain corpus).

The competitive analysis program 110 may search for the one or more seed terms in the external documentation stored in the knowledge corpus. The competitive analysis program 110 may identify the one or more seed terms in the external documentation and through text analysis identify one or more potential competitors associated with the one or more seed terms.

The competitive analysis program 110 may utilize natural language processing (NLP) techniques, such as those implemented in Watson™ (Watson and all Watson-based trademarks are trademarks or registered trademarks of International Business Machines Corporation in the United States, and/or other countries) application program interfaces (APIs), such as Watson™ Language Understanding, for text analysis to identify the one or more potential competitors associated with the seed terms.

The competitive analysis program 110 may utilize NLP techniques, such as, but not limited to Watson™ Language Understanding in characterizing the manner in which the one or more potential competitors are mentioned. The manner in which the one or more potential competitors are mentioned, may include, but is not limited to including, skills, salary, work experience, location, spending, hiring, equipment, amongst others.

The competitive analysis program 110 may store the external documentation with the one or more seed terms associated with the one or more potential competitors in the target business knowledge corpus.

The competitive analysis program 110 may compile a list of the one or more potential competitors identified utilizing at least the one or more seed terms. The competitive analysis program 110 may list the one or more competitors based on aggregate number of identifications. The aggregate number of identifications may be the total number of identifications of the one or more potential competitors.

For example, the competitive analysis program 110 may identify Company A, Company B, Company C, Company D, and Company E as potential competitors based on a search of the one or more seed terms in the external documentation. The competitive analysis program may identified that Company A was mentioned 5,000 times in association with the one or more seed terms, Company B was mentioned 4,000 times in association with the one or more seed terms, Company C was mentioned 3,000 times in association with the one or more seed terms, Company D was mentioned 2,000 times in association with the one or more seed terms, and Company E was mentioned 1,000 times in association with the one or more seed terms. The competitive analysis program may the one or more potential competitors in order from Company A through Company E.

At 208, the competitive analysis program determines one or more competitors. The competitive analysis program 110 may determine the one or more competitors by eliminating one or more non-competitors from the list of the one or more potential competitors. The competitive analysis program 110 may eliminate one or more non-competitors from the list of the one or more potential competitors by weighting the mentions of the one or more potential competitors. The competitive analysis program 110 may utilize default weighting settings. The competitive analysis program 110 may adjust the default weighting settings based on the target business. The competitive analysis program 110 may adjust the default weighting settings based on input from the client.

The competitive analysis program 110 may weight mentions based on recency. The competitive analysis program 110 may use metadata of the external documentation in determining the recency of the mention. The competitive analysis program 110 may assign more weight to more recent external documentation and the mentions associated with the one or more potential competitors than more dated (e.g., older) external documentation.

The competitive analysis program 110 may weight mentions based on the form of external documentation. For example, the competitive analysis program 110 may assign more weight to mentions in external documentation such as analyst reports than to mentions in external documentation such as social media posts.

The competitive analysis program 110 may weight mentions based on the engagement with the external documentation. Engagement may include, but is not limited to including, viewership, reposts, readership, favorites, likes. The competitive analysis program 110 may assign more weight to mentions in external documentation with higher engagement than to mentions in external documentation with lower engagement.

The competitive analysis program 110 may weight mentions based on the manner in which the one or more potential competitors are mentioned within the external documentation. The manner in which the one or more potential competitors are mentioned, may include, but is not limited to including, skills, salary, work experience, location, spending, hiring, equipment, amongst others. For example, if client A is looking to hire employees for target business A, the competitive analysis program 110 may assign more weight to mentions based on skills, salary, and hiring than mentions based on equipment.

The competitive analysis program 110 may eliminate one or more non-competitors from the list of one or more potential competitors by weighting the mentions of the one or more potential competitors. Continuing with the example described previously with respect to step 206 above, the competitive analysis program 110 may eliminate Company B and Company D from the list of one or more potential competitors based on the weighting of the mentions. The competitive analysis program 110 may determine that the one or more competitors for the target business are Company A, Company C, and Company E.

At 210, the competitive analysis program generates a competitive analysis report. The competitive analysis report may be based on a comparison of the target business and the one or more competitors determined by the competitive analysis program. The competitive analysis report may be comprised of at least, metrics, visualizations, and insights.

Insights may include sentiment analysis. IBM's Watson™ (Watson and all Watson-based trademarks are trademarks or registered trademarks of International Business Machines Corporation in the United States, and/or other countries) sentiment analysis APIs may be used to dynamically determine the favorability of the target business in comparison to the one or more competitors determined by the competitive analysis program 110.

Insights may include geographical analysis. Geographical analysis may include, but is not limited to including, geographies targeted by the one or more competitors, geographies operated in by the one or more competitors, geographic trends by the one or more competitors.

Insights may include a breakdown of the type of external documentation the one or more competitors were mentioned in association with. External documentation may include, but is not limited to including, job postings, earnings reports, annual reports, public contracts, press releases, social media posts, user reviews, analyst reports, published patents, amongst others. The competitive analysis program 110 may include a breakdown of the external documentation the one or more competitors were mentioned in association with, for example, 10 published patents, 50 job postings. 100 social media posts.

Insights may include an aggregate competitive score over time. The competitive analysis program 110 may provide visual insights of the aggregate competitive score over time in the competitive analysis report.

The competitive analysis report may be updated in real time. The competitive analysis report may be updated in real time by the competitive analysis program 110 by continuously identifying the one or more seed terms in external documentation. External documentation may be continuously added to the knowledge corpus as it is made publicly available.

The competitive analysis program 110 may update the competitive analysis report based on internal documentation received. The competitive analysis program 110 may update the competitive analysis report based on manual input from the client, such as, but not limited to, change in seed terms.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
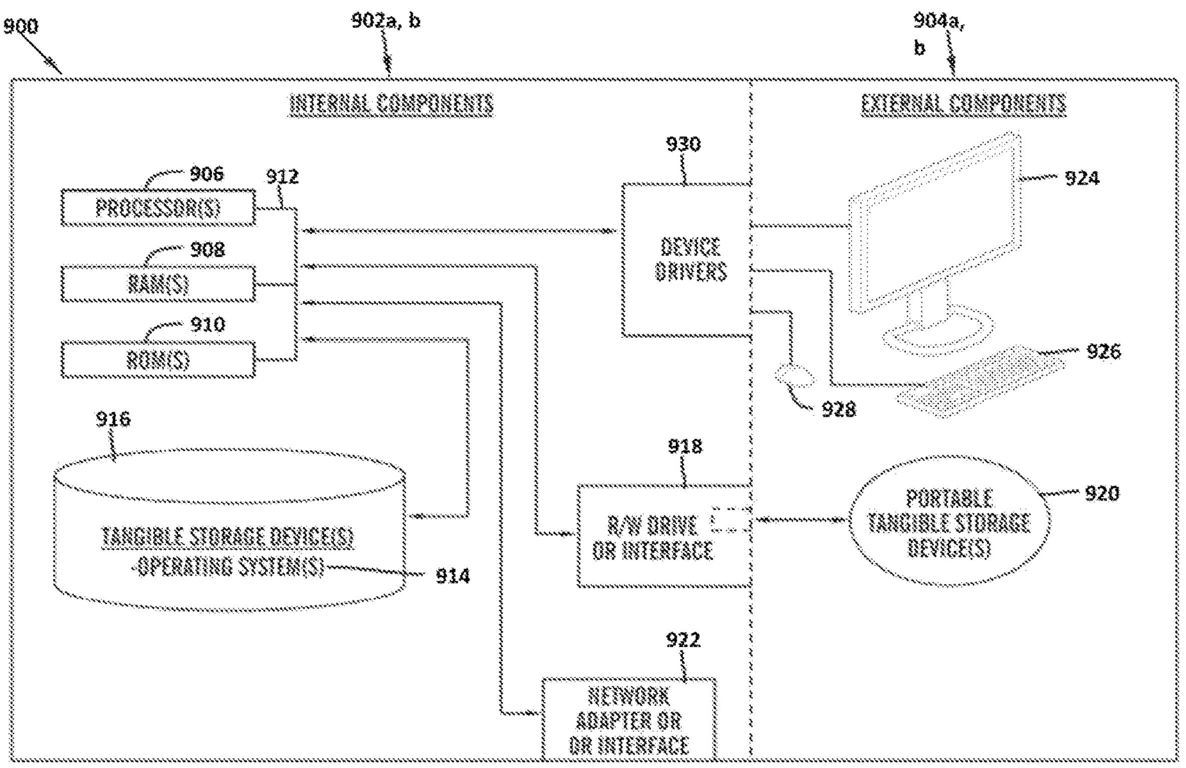
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 3. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the competitive analysis program 110*a* in client computer 102, and the competitive analysis program 110*b* in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the competitive analysis program 110*a* and 110*b* can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the competitive analysis program 110*a* in client computer 102 and the competitive analysis program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the competitive analysis program 110*a* in client computer 102 and the competitive analysis program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
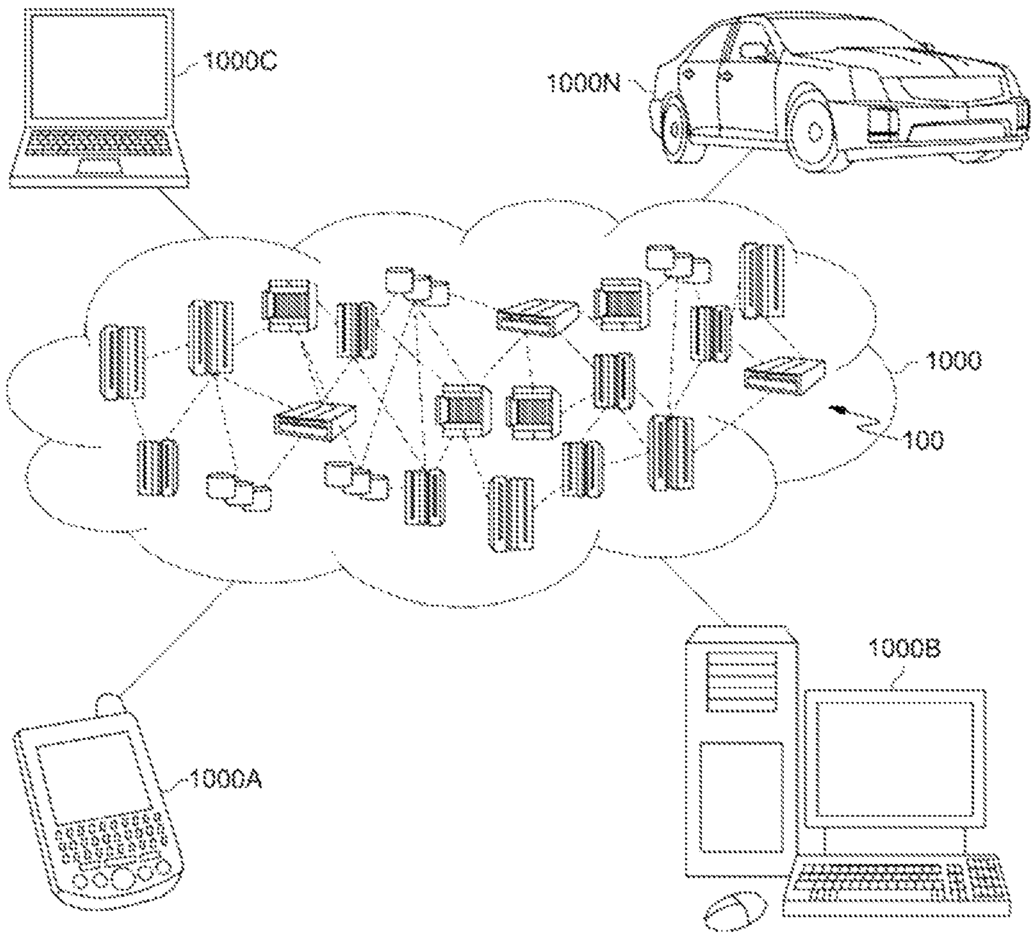
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
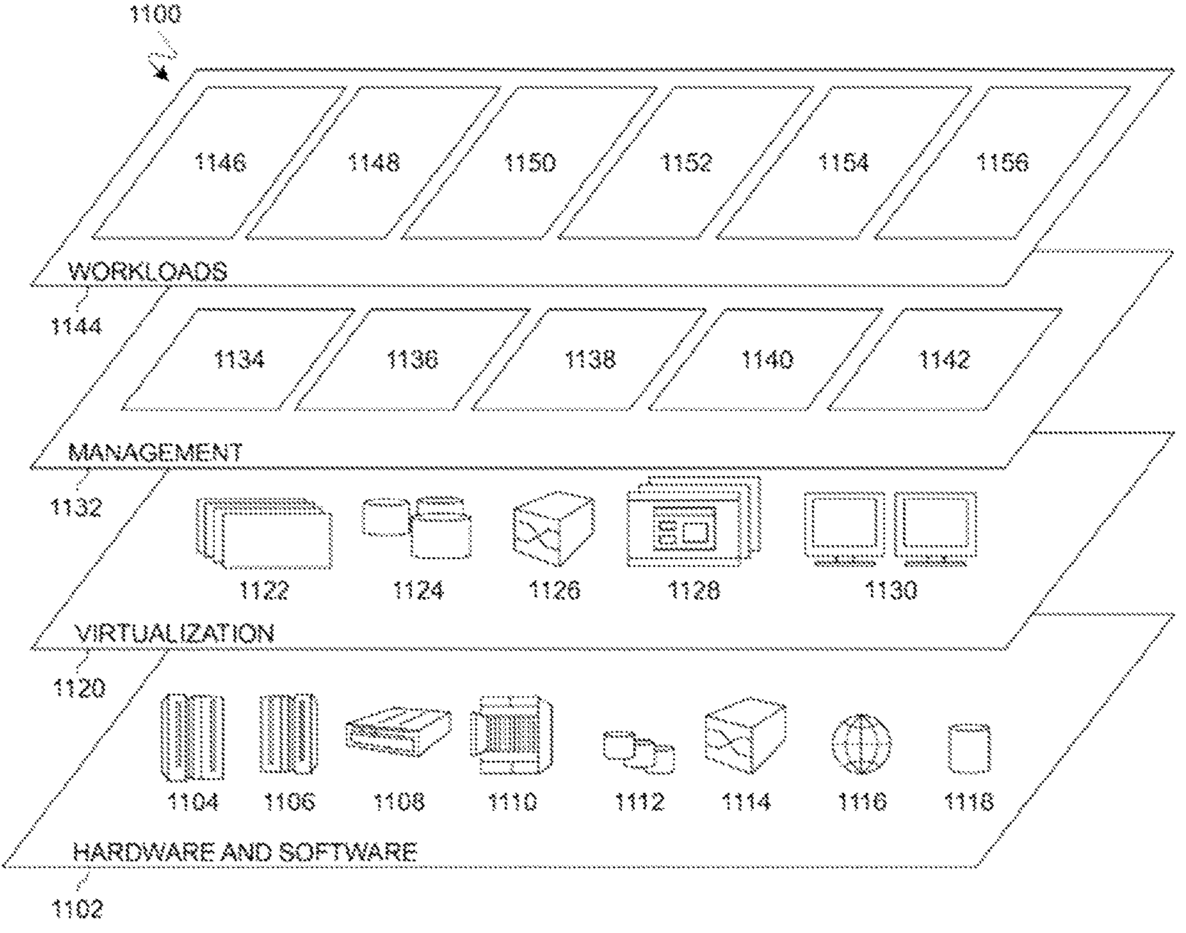
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and competitive analysis 1156. A competitive analysis program 110*a*, 110*b* provides a way to identify existing and emerging competitors using artificial intelligence in real time.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for competitive analysis, the method comprising:

receiving data related to a target business, wherein the target business is identified based on a user selection within a user interface;

identifying a plurality of seed terms associated with the target business using a machine learning model with Natural Language Processing to analyze the data related to the target business using one or more text analysis techniques;

performing a semantic relatedness analysis of the plurality of seed terms to determine whether each of the plurality of seed terms are above or below a similarity threshold, wherein one or more of the plurality of seed terms are determined to be above or below the similarity threshold based on a cosine similarity distance and requiring manual verification or elimination by the user within the user interface, and wherein the semantic relatedness analysis further includes analyzing the plurality of seed terms based on their source and using string similarity, Latent Semantic Indexing (LSI), and averaging uni-gram word embeddings;

training the machine learning model with Natural Language Processing based on one or more seed terms of the plurality of seed terms which are manually verified by the user within the user interface;

identifying a plurality of related businesses to the target business by searching a knowledge corpus using the one or more seed terms, wherein the knowledge corpus is comprised of external documentation and publicly available information related to a plurality of businesses;

determining one or more competitors by eliminating at least one of the plurality of related businesses identified, wherein the at least one of the plurality of related businesses identified are eliminated based on a weighting of mentions of the one or more seed terms, wherein the weighting of the mentions is determined based on at least a recency of the mention, a form of the external documentation in which the mention is derived, and an engagement with the external documentation in which the mention is derived; and generating a competitive analysis report, wherein the competitive analysis report includes at least a favorability of the target business in comparison to the one or more competitors and an aggregate competitive score over time which is continuously updated in real time based on additional seed terms identified in the external documentation related to the one or more competitors and manual changes to the plurality of seed terms by the user, wherein the competitive score over time is displayed to the user within the user interface utilizing visual insights.

2. The method of claim 1, wherein performing the semantic relatedness analysis further comprises:

tokenizing the plurality of seed terms using n-Gram tokenization and converting a plurality of tokenized seed terms into a plurality of vectors, wherein each of the plurality of vectors are compared using cosine similarity;

eliminating, by the user, the one or more seed terms below the similarity threshold;

verifying, by the user, the one or more seed terms above the similarity threshold;

storing the one or more verified seed terms in a target business knowledge corpus; and training the machine learning model with Natural Language Processing based on one or more eliminated seed terms and one or more verified seed terms.

3. The method of claim 2, wherein more than one similarity threshold is utilized, and wherein at least one of the similarity thresholds is automatically verified.

4. The method of claim 1, wherein the text analysis techniques include at least keyword extraction and the data related to the target business includes internal documentation, the external documentation, and manual input received from the user within the user interface, wherein the manual input is ontology terms relating to a taxonomy of the target business.

5. The method of claim 1, wherein the plurality of related businesses are listed according to an aggregate number of identifications, wherein the aggregate number of identifications may be categorized according to categories of the target business identified by the user in the user interface, wherein the competitive analysis report includes insights for each of the one or more competitors according to the categories of the target business identified by the user in the user interface.

6. The method of claim 1, wherein the favorability is determined based on a sentiment analysis of the target business as compared to the one or more competitors.

7. The method of claim 1, wherein the visual insights include a breakdown of the external documentation related to each of the one or more competitors.

8. The method of claim 1, wherein the determining of the one or more competitors further comprises:

characterizing, utilizing one or more Natural Language Processing (NLP) techniques, a manner in which the plurality of related businesses are mentioned within the external documentation; and assigning a greater weighting to the one or more seed terms based on the manner in which the one or more competitors are mentioned, wherein the manner in which the one or more competitors are mentioned corresponds to one or more goals of the target business identified by the user within the user interface.

9. The method of claim 1, wherein the weighting of the mentions are adjusted from default weighting settings based on the target business, wherein the target business is a product or service offered by a company.

10. The method of claim 1, wherein the weighting of the mentions are adjusted from default weighting settings based on input from the user, wherein the user assigns a greater weighting to a first form of external documentation and a lesser weighting to a second form of external documentation, and wherein the external documentation is continuously added to the knowledge corpus as it is made publicly available.

11. The method of claim 1, wherein the engagement with the external documentation in which the mention is derived is determined based on viewership, wherein the weighting of the one or more seed terms in the external documentation corresponds to the viewership of the external documentation.

12. A computer system for competitive analysis, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving data related to a target business, wherein the target business is identified based on a user selection within a user interface;

identifying a plurality of seed terms associated with the target business using a machine learning model with Natural Language Processing to analyze the data related to the target business using one or more text analysis techniques;

performing a semantic relatedness analysis of the plurality of seed terms to determine whether each of the plurality of seed terms are above or below a similarity threshold, wherein one or more of the plurality of seed terms are determined to be above or below the similarity threshold based on a cosine similarity distance and requiring manual verification or elimination by the user within the user interface, and wherein the semantic relatedness analysis further includes analyzing the plurality of seed terms based on their source and using string similarity, Latent Semantic Indexing (LSI), and averaging unigram word embeddings;

training the machine learning model with Natural Language Processing based on one or more seed terms of the plurality of seed terms which are manually verified by the user within the user interface;

identifying a plurality of related businesses to the target business by searching a knowledge corpus using the one or more seed terms, wherein the knowledge corpus is comprised of external documentation and publicly available information related to a plurality of businesses;

determining one or more competitors by eliminating at least one of the plurality of related businesses identified, wherein the at least one of the plurality of related businesses identified are eliminated based on a weighting of mentions of the one or more seed terms, wherein the weighting of the mentions is determined based on at least a recency of the mention, a form of the external documentation in which the mention is derived, and an engagement with the external documentation in which the mention is derived; and generating a competitive analysis report, wherein the competitive analysis report includes at least a favorability of the target business in comparison to the one or more competitors and an aggregate competitive score over time which is continuously updated in real time based on additional seed terms identified in the external documentation related to the one or more competitors and manual changes to the plurality of seed terms by the user, wherein the competitive score over time is displayed to the user within the user interface utilizing visual insights.

13. The computer system of claim 12, wherein performing the semantic relatedness analysis further comprises:

tokenizing the plurality of seed terms using n-Gram tokenization and converting a plurality of tokenized seed terms into a plurality of vectors, wherein each of the plurality of vectors are compared using cosine similarity;

eliminating, by the user, the one or more seed terms below the similarity threshold;

verifying, by the user, the one or more seed terms above the similarity threshold;

storing the one or more verified seed terms in a target business knowledge corpus; and training the machine learning model with Natural Language Processing based on one or more eliminated seed terms and one or more verified seed terms.

14. The computer system of claim 13, wherein more than one similarity threshold is utilized, and wherein at least one of the similarity thresholds is automatically verified.

15. The computer system of claim 12, wherein the text analysis techniques include at least keyword extraction and the data related to the target business includes internal documentation, the external documentation, and manual input received from the user within the user interface, wherein the manual input is ontology terms relating to a taxonomy of the target business.

16. A computer program product for competitive analysis, comprising:

one or more non-transitory computer-readable storage media and program instructions stored on at least one of the one or more tangible storage media, the program instructions executable by a processor to cause the processor to perform a method comprising:

receiving data related to a target business, wherein the target business is identified based on a user selection within a user interface;

identifying a plurality of seed terms associated with the target business using a machine learning model with Natural Language Processing to analyze the data related to the target business using one or more text analysis techniques;

performing a semantic relatedness analysis of the plurality of seed terms to determine whether each of the plurality of seed terms are above or below a similarity threshold, wherein one or more of the plurality of seed terms are determined to be above or below the similarity threshold based on a cosine similarity distance and requiring manual verification or elimination by the user within the user interface, and wherein the semantic relatedness analysis further includes analyzing the plurality of seed terms based on their source and using string similarity, Latent Semantic Indexing (LSI), and averaging unigram word embeddings;

training the machine learning model with Natural Language Processing based on one or more seed terms of the plurality of seed terms which are manually verified by the user within the user interface;

identifying a plurality of related businesses to the target business by searching a knowledge corpus using the one or more seed terms, wherein the knowledge corpus is comprised of external documentation and publicly available information related to a plurality of businesses;

determining one or more competitors by eliminating at least one of the plurality of related businesses identified, wherein the at least one of the plurality of related businesses identified are eliminated based on a weighting of mentions of the one or more seed terms, wherein the weighting of the mentions is determined based on at least a recency of the mention, a form of the external documentation in which the mention is derived, and an engagement with the external documentation in which the mention is derived; and generating a competitive analysis report, wherein the competitive analysis report includes at least a favorability of the target business in comparison to the one or more competitors and an aggregate competitive score over time which is continuously updated in real time based on additional seed terms identified in the external documentation related to the one or more competitors and manual changes to the plurality of seed terms by the user, wherein the competitive score over time is displayed to the user within the user interface utilizing visual insights.

17. The computer program product of claim 16, wherein performing the semantic relatedness analysis further comprises:

tokenizing the plurality of seed terms using n-Gram tokenization and converting a plurality of tokenized seed terms into a plurality of vectors, wherein each of the plurality of vectors are compared using cosine similarity;

eliminating, by the user, the one or more seed terms below the similarity threshold;

verifying, by the user, the one or more seed terms above the similarity threshold;

storing the one or more verified seed terms in a target business knowledge corpus; and training the machine learning model with Natural Language Processing based on one or more eliminated seed terms and one or more verified seed terms.

18. The computer program product of claim 17, wherein more than one similarity threshold is utilized, and wherein at least one of the similarity thresholds is automatically verified.

19. The computer program product of claim 16, wherein the text analysis techniques include at least keyword extraction and the data related to the target business includes internal documentation, the external documentation, and manual input received from the user within the user interface, wherein the manual input is ontology terms relating to a taxonomy of the target business.

* * * * *